May 21, 1968
I. D. KUTCHER
3,384,048
AUTOMATIC GLAZING AND SANDING MACHINE
Filed June 1, 1964
3 Sheets-Sheet 1
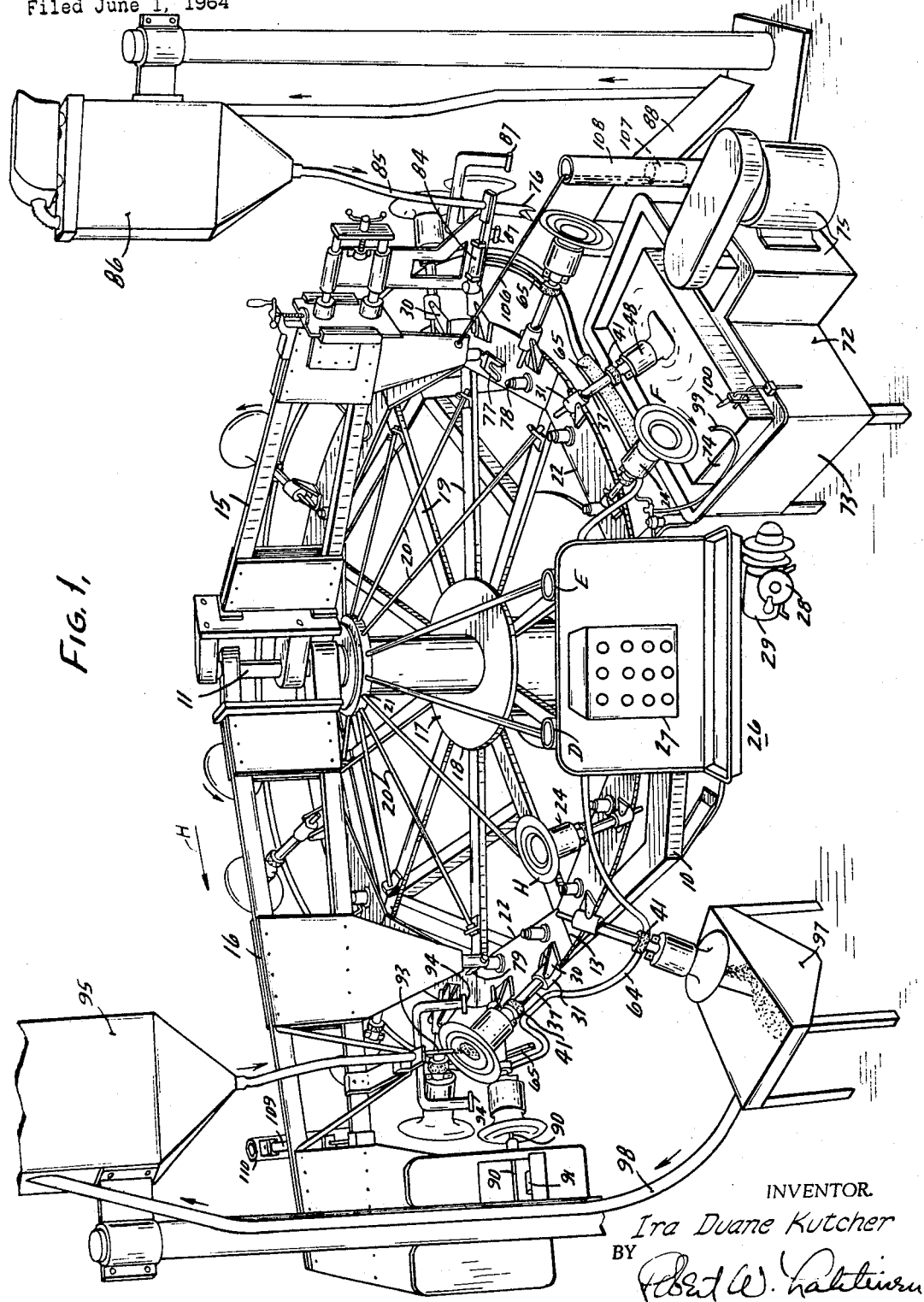
INVENTOR.
Ira Duane Kutcher
BY
ATTORNEY.

May 21, 1968     I. D. KUTCHER     3,384,048
AUTOMATIC GLAZING AND SANDING MACHINE
Filed June 1, 1964     3 Sheets-Sheet 2
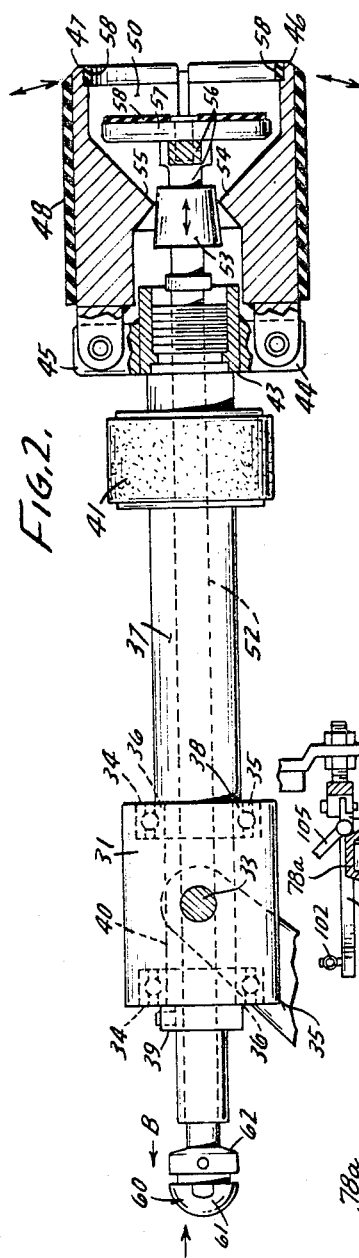
INVENTOR.
Ira Duane Kutcher
BY
ATTORNEY.

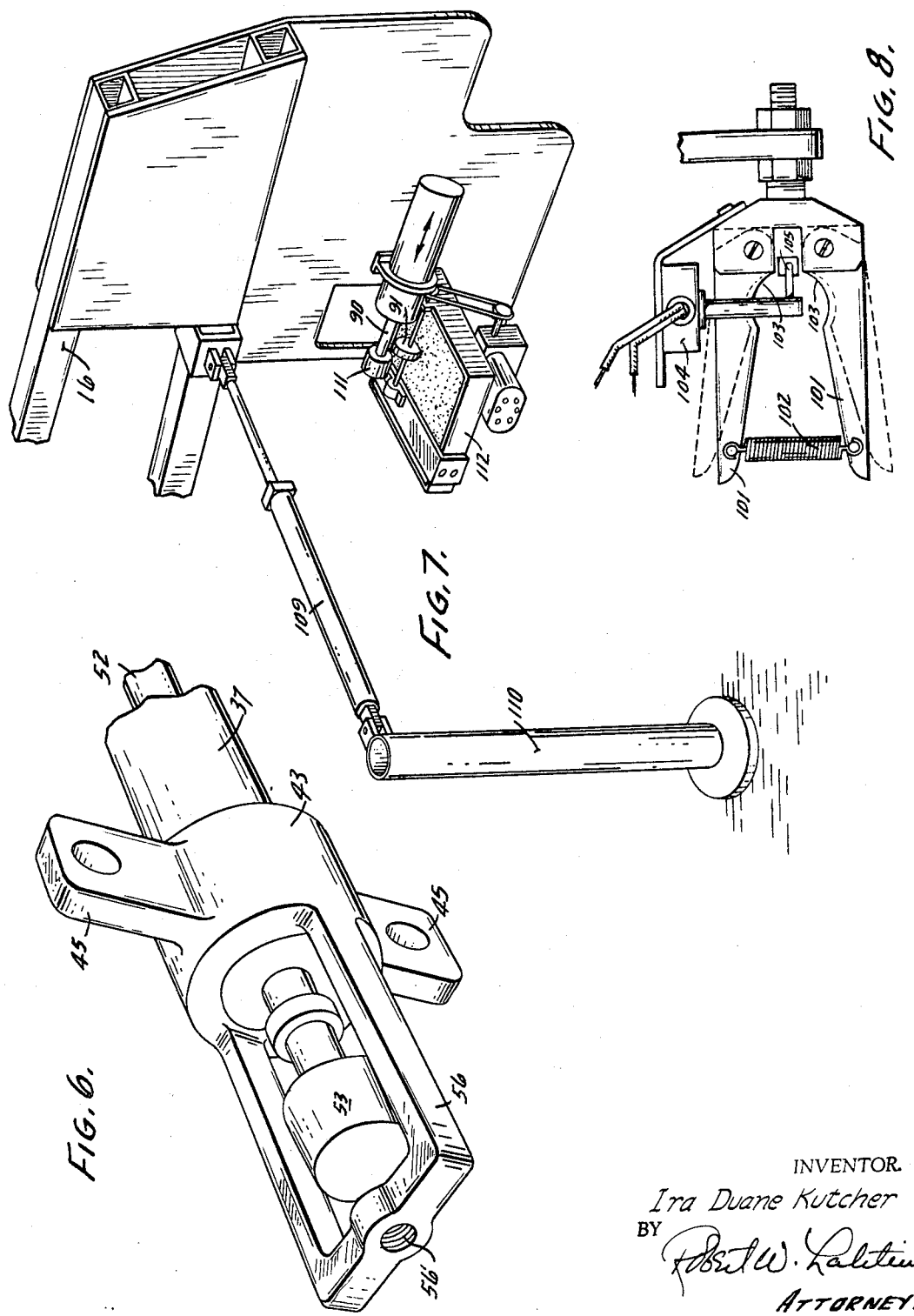

ly through the spindle shaft 37 with a frusto-conical cam 53 secured thereto which engages projections 54, 55 on the jaws 46, 47 and causes the jaws to move apart or open upon axial movement of the rod to the right as viewed in FIGURE 2.

United States Patent Office 3,384,048
Patented May 21, 1968

3,384,048
AUTOMATIC GLAZING AND SANDING MACHINE
Ira Duane Kutcher, Macomb, Ill., assignor to McGraw-Edison Company, Milwaukee, Wis., a corporation of Delaware
Filed June 1, 1964, Ser. No. 371,503
6 Claims. (Cl. 118—2)

This invention relates to machines for processing electrical porcelain products and more particularly to an improved machine for applying liquid glaze and a sand grip surface to porcelain insulators.

In the manufacture of porcelain insulators of the suspension type having a head portion and a series of concentric skirts is it necessary to apply a liquid glaze material over a major portion of the surface and also apply sand in the pinhole and and in the form of band about the head to miprove bonding to the associated hardware. Where it is necessary to use manual operations for any portion of the process it is not possible to obtain a uniform completed article of porcelain ware.

This invention is directed to a machine which performs all of the glazing and sanding operations automatically and requires only loading and unloading of the machine. The machine of this invention further accomplishes this result with a more simple, maintenance free device than has been heretofore known. In this machine artiules of porcelain ware to be processed are mechanically retained in work holding spindles that move through a generally circular path during the operating cycle with the spindles rotated about their own axes and pivotally mounted to the carrying frame for upward and downward pivotal movement. The machine utilizes a simplified method for selectively increasing the rotational speed of the spindles about their axes during selective periods of progress about the generally circular path of travel and provides indexing operating stations which reciprocate to periodically move in unison with the spindle in the path of travel to accommodate those operations that are best accomplished by an operating station that is stationary with respect to the mounting on which the rotating work piece is carried.

It is an object of this invention to provide an improved machine for applying liquid glaze and sand to electrical insulators.

It is another object of this invention to provide a machine having an improved work holding spindle and structure for retaining and clamping the work therein.

It is also an object of this invention to provide a glazing and sanding machine that performs all glazing and sanding operations automatically.

It is also an object of this invention to provide a machine incorporating an automatic indexing support structure which carries operating stations that are better suited to operation at a stationary location with respect to the work piece.

It is a further object of this invention to provide a machine incorporating a simplified means for rotating the work pieces at varying rotational speeds during selective portions of the operating cycle.

These and other objects and advantages of this invention will become apparent from the following description when taken in connection with the accompanying drawings, wherein:

FIGURE 1 is a schematic perspective view, partly broken away, of a preferred form of the invention;

FIGURE 2 is a side view partly in section of an article retaining spindle of the machine of FIGURE 1;

FIGURE 3 is a view of the spindle release mechanism at the operator's station as seen looking radially outward from the edge of the rotatable frame;

FIGURE 4 is an elevation partly broken away and partly in section showing the structure that effects selective engagement between the rotating frame and the sanding arms;

FIGURE 5 is an elevation partly in section showing a spindle engaging a portion of an auxiliary track segment;

FIGURE 6 is a perspective view of the article retaining end of the spindle of FIGURE 2 with the jaws and guide plate removed;

FIGURE 7 is a schematic view showing the sanding arm return and glue applicator; and FIGURE 8 is a plan view of the sanding arm pickup device.

Referring to FIGURE 1 the glazing and sanding machine of this invention includes a machine bed 10 which supports a vertical pivot member 11 about which are journaled a rotating frame 13 and a pair of sanding arms 15, 16. The frame 13 includes a spool shaped hub 17 from the flange 18 of which radially extend a series of spokes 19 each of which is supported by a tension rod 20 extending from the upper flange 21 of the hub. Extending between the radial ends of adjoining spokes 19 are a series of plates 22 which carry the ware holding spindles 24. At the operator's station 26 is a control panel 27 which is mounted on the machine bed 10. A speed control 28 enables the operator to adjust the rotational speed of the frame by varying the effective diameter of a pulley in the drive train from motor 29 to the rotating frame 13 which rotates the frame 13 in a counter-counterclockwise direction as indicated by the arrow H in FIGURE 1.

Uniformly spaced about the periphery of the rotatable frame 13 are a series of generally U-shaped clevis members 30 in which are pivotally mounted the article holding spindles 24 allowing the spindles freedom to move, with respect to the clevis, upwardly and downwardly in a generally radial plane. As more clearly seen in FIGURE 2 each spindle 24 includes a bearing housing 31 which is pivotally connected to the associated clevis 30 by a pair of coaxial pins which project into openings 33 in the housing from each flange of the associated clevis. The bearing housing 31 is fixedly mounted about the outer races 34 of a pair of ball-bearing members 35 permitting the remainder of the spindle assembly to rotate freely about its own axis. The inner races 36 of the ball-bearings 35 are retained about the spindle tubular shaft member 37 between a shoulder 38 where the diameter of the shaft is reduced and a collar 39 which is fixedly positioned by a set screw, with the bearing inner races maintained in a set axially spaced relation by a spacer sleeve 40. A track wheel 41 is rigidly secured about the spindle shaft 37 and includes a rubber peripheral tread surface for effective frictional engagement as described hereafter. A collar 43 having a pair of ears 44, 45 extending radially therefrom is carried at one end of the spindle shaft with a pair of semi-cylindrical article engaging jaws 46, 47 pivotally connected respectively to the ears 44, 45. A heavy duty band 48 of elastic rubber material surrounds the jaws and urges them toward one another to effect a closed condition. A generally cylindrical article retaining recess 50 is formed between the jaws 46, 47. A rod 52 extends axial- A generally U-shaped support 56 (FIGURE 6) extends from the collar 43 to form an enclosed slotted opening surrounding the cam 53. A cylindrical guide plate 57 has a threaded pin extending axially therefrom which is received in the threaded support opening 56' to effect a fixed connection between the guide plate and collar 43.

A layer of rubber cushioning material 58 is carried by the article or ware engaging portions of the jaws 46, 47 and the guide plate 57.

At the opposite end of the rod 52 and positively secured thereto is a cam 60 which presents camming surfaces 61, 62 which face in opposite axial directions so that a force applied to the cam surface 61 in the direction of arrow A will reciprocate the rod to the right causing the jaws 46, 47 to open and a force applied to the camming surface 62 in the direction of arrow B will withdraw the rod 52 to the left causing the elastic band 48 to close the jaws 46, 47 as the frusto-conical cam 53 is withdrawn to the left. It is necessary to cam the rod 52 in both axial directions since the axial component of the constricting force of the band 48 exerted by the jaw projections 54, 55 against the frusto-conical cam 53 is not sufficient to assure movement of the rod in the direction of arrow B.

As seen in FIGURES 1 and 2 the spindle 24 projects radially outward from the frame with the center of gravity of the spindle and the carried porcelain ware substantially outward of the axis of pivotal support to urge the spindle to pivot downwardly. The attitude of the spindle during its passage through a generally circular path as the frame 13 is rotated during the operating cycle is largely determined by the engagement between track 64 and the track wheel 41. The track 64 is supported at frequent intervals by a series of bracket members which project from the machine bed 10, but which are not shown in the interest of clarity. The track wheel tread causes frictional engagement that induces each spindle 24 to rotate about its axis as the frame rotation induces the spindles to progress through a generally circular path. The track 64 is normally of circular configuration radially outward from the frame 13 but at various operating stations it will be noted that there are undulations in the track to cause the spindle to pivot upward or downward in accordance with the requirements of the particular operation.

During some of the operations it is desirable that the spindle rotate at a greater speed and for this purpose auxiliary track sections 65, with a length regulated by the duration requirement of the particular operating station, are provided at locations where such greater rotational speed is needed. The auxiliary track portions 65 are positioned to engage the spindle shaft 37 adjoining the track wheel 41 with an elevational difference between the auxiliary track and principal track 64 being such that the track wheel is disengaged from the principal track (FIGURE 5). The auxiliary track portion 65 frictionally engages the spindle shaft, that is of smaller diameter than the track wheel, inducing an increased rotational velocity as the frame progresses. The auxiliary track may have a rubber tread surface, as shown in FIGURE 5, to assure greater frictional engagement or be a metal track engaging the metal spindle shaft 37. When the auxiliary track segment 65 terminates the principal track 64 again engages the track wheel 41 to re-establish the normal speed of spindle rotation.

The machine is loaded and unloaded at the operator's station 26. As the spindle terminates its cycle and approaches the operator's station the track 64 rises to bring the spindle toward a vertical position and the cam member 60 of the rod 52 is guided onto a camming track 67, FIGURE 3, which rises relative to the spindle axial end, engaging the cam 60 and moving it upwardly in an axial direction to cause the push rod 52 to open the jaws 46, 47 and release the processed porcelain ware to a condition where it is no longer clamped but merely supported within the spindle jaws. To assure a positive camming action between the spindle and the camming track 67 a pressure plate 68 is provided with a lower surface that is engageable with the upper axial end of the bearing housing 31 as the spindle moves past the operator's station 26. The camming track side rails 69 act to maintain the spindle in a generally vertical position during the period when the clamping pressure on the jaws is relaxed allowing the processed porcelain ware to be removed and replaced with an unprocessed article of ware before the spindle reaches the terminal portion of the camming track 67. As the spindle approaches the terminal end of the camming track 67 a pair of camming blocks 70 engage the upper camming surface 62 of the cam 60 and retract the rod 52 downwardly to remove the restraint of the cam 53 on the jaws 46, 47 and assure that the jaws will positively retain the newly inserted article of ware prior to release of the spindle from the camming track. As the spindle moves away from the operator's station engagement between the spindle track wheel 41 and principal track 64 is re-established to cause rotation and to determine spindle attitude during the subsequent cycle of operation. The camming blocks 70 project toward one another with downwardly facing camming surfaces overlying the camming track by extending between the axial end of the spindle shaft 37 and the camming surface 62 of the cam 60.

A glaze tank 72 is provided through which the ware is rotated to apply glaze to the surface thereof. This tank 72 includes an outer tank 73 and an inner tank 74 with a pump and motor 75 that continuously pumps liquid glaze material from the outer tank to the inner tank with the excess liquid continuously overflowing the upper edge of the inner tank and returning to the outer tank. By so doing a constant level is maintained which level can be adjusted by raising or lowering the inner tank 74 through an adjustment which is not shown. The height of the inner tank 74 is normally adjusted so that the lowermost projection of the spindle 24 is rotated just above the surface of the liquid glaze without contacting the liquid.

For some operations it is desired that, although the article being processed be rotated, the operating station should remain fixed with respect to the article during the operation. For this purpose two reciprocating pivotal support structures 15, 16 are provided. The support structure or sanding arm 15 applies a band of sand grip to the exterior generally cylindrical head surface, of the porcelain suspension insulators illustrated, as the spindle is rotated under the sand dispenser head 76. The sand dispenser head 76 is positioned with respect to the spindle by engagement between the arm pickup 77 and a cooperating projecting pin 78 carried by the frame 13.

The support structure or sanding arm 15 is pivotally mounted about the pivot member 11 on the vertical axis of the machine bed 10 for limited reciprocating pivotal movement. As shown also in FIGURES 4 and 8, the sanding arm 15 carries a bifurcated pickup device 77 which overlies the normal circular path of the projecting pins 78 carried by the frame 13 radially inward of each spindle location. The projecting pin has a hardened steel frusto-conical upper cap 78a and a hardened steel lower cap 78b in the form of a spherical segment and is positioned by apertures in the plate 22 and the cover 80 which is bolted to the plate 22 to enclose all but the vertically projecting portions of the pin 78 and hardened caps 78a and 78b. A compression spring 81 normally biases the pin 78 downwardly to the location shown at the left side of FIGURE 4. As the pin 78 approaches the start position of the sanding arm 15 a camming track 83 underlying the frame 13 engages the hardened cap 78b of pin 78 and moves it upwardly against the biasing force of spring 81 to a vertical position that will cause engagement between the frusto-conical surface of the cap 78a and pickup device 77 whereupon the sanding arm 15 will rotate in unison with the frame 13.

As viewed in FIGURES 4 and 8 the pickup device 77 has two pivoted arms 101 that are urged together by a spring 102. At the vertex of the pickup device is a generally circular re-entrant surface 103 that functions as a detent to positively position the sanding arm 15 with respect to the frame 13. A rotary switch 104 has an actuating arm 105 that extends into the space between the pivoted arms 101 and is moved to an actuated position when a projecting pin 78 is positioned in the pickup device detent.

The length of the camming track 83 determines the duration of unitary travel. When the pin 78 reaches the end of the track 83 the spring 81 causes the pin to move downwardly out of contact with the detent surface 103 of the pickup 77, freeing the arm 15 to move back to the start position in preparation for the next succeeding operation.

The sanding arm 15 is returned in a direction opposite to the direction of rotation of the frame 13 by a counterweight including a cable 106 secured at one end to the sanding arm or support structure 15 and at the other end to a weight 107 that travels vertically within a tube 108 secured to the glaze tank 73.

Engagement between pickup device 77 and pin 78 causes the switch 104 to energize the pneumatic actuator 84 to permit sand to flow through tube 85 from hopper 86 to the dispenser head 76 which closely adjoins the insulator head for application of the exterior band during the period of unitary travel. A pair of photoelectric sensing elements 87 are carried by the sanding arm 15 and function to prevent energizing of actuator 84 when an insulator is not present in the spindle at the sanding station. A trough 88 is provided for the collection of excess sand which is picked up at the lower terminous of the trough by a sand return and returned to the hopper 86 by vacuum or other means.

The support or sanding arm 16 utilizes an identical arm pickup device 79 in cooperation with the frame carried projecting pins 78 and a cam track 83 underlying the frame.

When the projecting pin 78 is disengaged from the pickup device 79 the sanding arm 16 is returned in a direction opposite to the direction of rotation of frame 13 by a pneumatic cylinder 109, (FIGURE 7) which is interconnected, between the arm 16 and a stationary post 110. This return mechanism is provided in preference to the counterweight associated with arm 15 to assure a quick return and provide a longer period of unitary travel during each cycle of operation.

Mounted on the sanding arm 16 is a glue applicator which applies a layer of liquid adhesive material to the insulator pinhole. This is effected by a glue laden sponge 111 (FIGURE 7) attached to the distal end of a rod 90 which is reciprocated into the pinhole as a spindle carried insulator is rotated and moves along the generally circular path in unison with the sanding arm 16. In the retracted position the glue applicator sponge 111 contacts a revolving roller 91 which rotates in a glue reservoir 112 to pick up glue on the surface thereof and transfer a supply to the applicator sponge. During the application of glue to the insulator pinhole the spindle shaft 37 engages an auxiliary track section 65 to increase the rotational velocity of the spindle. The spindle which is advanced one position beyond that where the glue is applied is carried upwardly by the track 64 to a position where the pinhole faces the dependent end of the sand dispenser 93. When the photoelectric sensing element 94 indicates that an insulator is carried by a spindle positioned at the sanding station a supply of sand sufficient to fill the pinhole is released from the supply in the hopper 95 which, assisted by the rotation of the insulator along the track, causes a layer of sand to adhere to the surface to which adhesive has been applied. A tank 97 is supplied for excess sand which is dumped from the insulator pinhole with such sand being returned to the hopper by means of a vacuum through the sand return line 98, as shown, or by other suitable means.

In operation an article of porcelain ware to be processed is placed in the opened spindle jaws as the spindle moves past the operator station 26 between positions D and E. As described above, before the spindle 24 leaves the generally vertical position the insulator is clamped within the jaws 46, 47 and thereafter the spindle 24 is released from engagement with camming track 67 to have its attitude controlled by the principal track 64. As the spindle moves toward the position indicated at F a blast of compressed air from the terminal end of line 99 removes any loose particles from the insulator skirt surfaces. As the insulator approaches the surface of the glaze tank a jet of glaze is pumped from the nozzle 100 directly into the insulator pinhole to assure thorough coverage of that portion of the pinhole surface that would not, through the entrapment of air, be in contact with the liquid glaze as the ware is immersed in and rotated through the liquid glaze contained in the inner tank 74. Also as the spindle approaches the surface of the glaze tank an auxiliary track 65 engages the spindle shaft 37 to increase the rotational speed of the spindle as the porcelain ware or insulator is rotated through the liquid glaze. As the spindle approaches the end of the inner tank 74 the auxiliary track 65 terminates and the track wheel 41 once again engages the principal track 64 which rises to pivot the spindle upwardly out of the tank to its normally generally horizontal radially extending attitude. The spindle next approaches the sanding arm 15 where it is once again desired to utilize a greater rotational speed which is provided by another segment of auxiliary track 65 that engages the spindle shaft 37 and disengages the track 41 from the principal track 64. When the sanding arm pickup 77 engages the projecting pin 78 mounted on the frame 13 radially inward of the spindle the sand dispenser head 76 is in close proximity to the generally cylindrical exterior surface of the insulator head where it is desired to apply a band of sand grip. A quantity of sand is released through the dispenser head 76 a portion of which adheres in the form of an annular band to the still wet surface. When the band of sand has been applied the projecting pin 78 is released from engagement with the pickup 77 carried by the sanding arm and the spindle moves from the auxiliary track 65 back into contact with the principal track 64 and continues to rotate and move in a circular path allowing the liquid glaze to dry prior to next subsequent operation.

When the pickup 79 of the sanding arm 16 has engaged the projecting member at the rear of the spindle a layer of glue is applied to the pinhole by the reciprocating glue laden sponge and upon indexing once more with respect to the sanding arm 16 the spindle is pivoted upwardly by the rise in the track 64 and faces the discharge end of the sand dispensing head 93 to receive a quantity of sand in the pinhole of the insulator. Following a short period of rotation in an upwardly inclined attitude to assure intimate contact between the loose sand and the complete area to which adhesive has been applied the track dips rapidly downward to dump the excess sand into the tank 97 and again rises rapidly toward the position indicated at H as the spindle moves toward a vertical position and approaches the cam track at the operator's station where the cycle of the machine terminates and the ware is removed.

Although but one embodiment has been shown and described it will be apparent to those skilled in the art that various changes and modifications may be made therein without departing from the spirit of the invention or from the scope of the appended claims.

What is claimed is:

1. A machine for holding a plurality of articles and moving said articles along a generally circular path and automatically releasing said articles before one complete revolution about said circular path comprising a substantially horizontal frame rotatable about a vertical axis; a plurality of radially extending article holding spindles each rotatable about the axis thereof and mounted on said frame for pivotal movement in a radial plane; a track radially outward of said frame; said spindles each carrying a track engaging wheel for frictional engagement with said track to effect rotation of said spindles during rotation of said frame and article holding clamping jaws carried by each of said spindles at one end thereof; biasing means urging said jaws toward a closed article holding position; a plurality of rod members extending respectively through said spindles and reciprocable with respect thereto, said rod members each presenting a frusto-conical first camming surface portion operatively associated with said jaws to overcome said biasing means and move said jaws apart to an article releasing position when moved in one axial direction to a first position and a second camming portion carried by said rod at the spindle end opposite said one end; and a guide plate carried by each of said rod members for movement in unison therewith and disposed respectively between said jaws with an axial end surface generally perpendicular to the axis of said rod which is engageable with the article carried by said spindle.

2. The machine of claim 1 further comprising an operator station, means guiding said spindles past said operator's station in a substantially vertical position, cam means adjacent said operator's station engaging said rod member second camming portion and moving said rod in said one axial direction to maintain said jaws in an article releasing position while passing said operator's station.

3. A machine for holding a plurality of articles, moving said articles along a generally circular path and releasing said articles before one complete revolution about said circular path comprising a substantially horizontal frame rotatable about a vertical axis; a plurality of radially extending article holding spindles each rotatable about the axis thereof and mounted on said frame for pivotal movement in a radial plane; a track radially outward of said frame; each of said spindles having a hollow shaft member carrying a track engaging wheel and a pair of jaws at one end, biasing means urging said jaws toward a closed article engaging position, a rod journaled through said shaft carrying first cam means adjacent said one end and engageable with said jaws to overcome said biasing means and urge said jaws apart when said rod is moved axially toward said one end, said rod projecting axially beyond said shaft at the end opposite said one end, second cam means mounted on said rod axially projecting portion; a camming track having an upwardly facing first surface including a rise portion and a downwardly facing, downwardly inclining second surface, said first and second surfaces being positioned to sequentially engage said rod members second cam means to cam said rod toward said one end of said spindle to a jaw opening actuated position and thereafter withdraw said rod away from said one end of said spindle; and guide means retaining said spindle in a generally veritcal position while said rod is in said actuated position including radially spaced arcuate surfaces disposed at opposite sides of the spindle path to confine said second cam means.

4. A machine for glazing and sanding porcelain insulators by moving articles in a generally circular path past a plurality of operating stations and releasing said articles before making a complete revolution comprising a substantially horizontal frame rotatable about a vertical axis; a plurality of radially extending article holding spindles each rotatable about its own axis and mounted on said frame for pivotal movement in a radial plane with a coaxial wheel portion and a shaft portion having a diameter smaller than said wheel portion, a first stationary track radially outward of said frame having portions frictionally engageable with said spindle wheel portions to respectively rotate said spindles about the axes thereof at a first rotational speed as said frame is rotated and a second stationary track portion engageable with said spindle shaft portions to cause spindles engaged therewith to rotate at a second rotational speed greater than said first rotational speed, said first and second track portions cooperating to provide continuous control of the attitude of said spindles in the respective radial planes thereof and rotation of said spindles during movement in unison with said frame past said operating stations.

5. A machine for processing electrical insulators by holding a plurality of insulators which are moved along a generally circular path past a series of operating stations and released before making a complete revolution comprising a base member; a substantially horizontal frame mounted on said base member and rotatable about a vertical axis; means for rotating said frame about said axis in one direction; a series of insulator holding spindles each rotatable about the axis thereof and mounted on said frame for pivotal movement in a radial plane; a support structure having an operating station carried thereby and mounted for reciprocating pivotal movement about said vertical axis; a plurality of releasable engaging means interconnecting said support structure and said frame for periods of unitary travel in said one direction to position said operating station sequentially in an operating position with respect to each successive spindle carried insulator during a predetermined period of angular rotation along said generally circular path, said period of angular rotation being less than the angular distance between adjoining spindles; and means actuable by the presence of an insulator carried by a spindle disposed in operating position at said operating station for activating equipment associated with said operating station.

6. The machine of claim 5 wherein said releasable engaging means comprises a pin mounted on and extending through said frame for vertical reciprocating movement, means biasing said pin in one direction; cam means carried by said base member and engageable with said pin during a predetermined period of angular rotation of said frame to move said pin in the direction opposite said one direction against said biasing means to a first position, engaging means carried by said support structure engageable with said pin when the latter is retained in said first position to cause said frame and support structure to rotate in unison, and control means activated by said pin when said pin is in said first position and engaging said support structure.

References Cited
UNITED STATES PATENTS

| | | | |
|---|---|---|---|
| 1,708,429 | 4/1929 | Mueller et al. | 118—416 |
| 1,959,711 | 5/1934 | Flint et al. | 118—319 |
| 1,977,704 | 10/1934 | Vaughan et al. | 118—54 |
| 2,119,720 | 6/1938 | Reifsnyder | 118—416 |
| 2,217,247 | 10/1940 | Burns | 118—312 |
| 2,332,058 | 10/1943 | Cattonar et al. | 294—116 X |
| 2,463,422 | 3/1949 | Ransburg et al. | 118—320 X |
| 2,574,686 | 11/1951 | Brown | 118—56 X |
| 2,669,478 | 2/1954 | Bowie | 294—116 X |
| 2,821,158 | 1/1958 | Brown et al. | 118—416 X |
| 3,117,026 | 1/1964 | Spier | 118—263 X |

CHARLES A. WILLMUTH, Primary Examiner.

J. P. McINTOSH, Assistant Examiner.